United States Patent [19]

Ramsay

[11] 4,166,670
[45] Sep. 4, 1979

[54] OPTICAL FIBER CABLE

[75] Inventor: Melvin M. Ramsay, Harlow, England

[73] Assignee: International Standard Electric Corporation, New York, N.Y.

[21] Appl. No.: 816,383

[22] Filed: Jul. 18, 1977

[30] Foreign Application Priority Data

Jul. 27, 1976 [GB] United Kingdom ............... 31233/76

[51] Int. Cl.² .............................................. G02B 5/16
[52] U.S. Cl. .................................................. 350/96.23
[58] Field of Search ............... 350/96.23, 96.24, 96.25; 174/70 R, 128 R

[56] References Cited

U.S. PATENT DOCUMENTS

| 3,505,046 | 4/1970 | Phaneuf | 350/96.24 |
| 3,865,466 | 2/1975 | Slaughter | 350/96.23 |
| 3,887,265 | 6/1975 | Margolis et al. | 350/96.23 |
| 3,930,714 | 1/1976 | Dyott | 350/96.30 |
| 3,989,567 | 11/1976 | Tardy | 350/96.21 |
| 4,037,923 | 7/1977 | Beal | 350/96.23 |
| 4,093,342 | 6/1978 | Foord et al. | 350/96.23 |

FOREIGN PATENT DOCUMENTS

| 2414199 | 11/1975 | Fed. Rep. of Germany | 350/96.23 |
| 1250823 | 10/1971 | United Kingdom | 350/96.23 |

OTHER PUBLICATIONS

S. G. Foord et al., "Principles of Fiber-Optical Cable Design" Proc. IEE, vol. 123, No. 6, Jun. 1976, pp. 597-602.

Primary Examiner—Rolf G. Hille
Attorney, Agent, or Firm—Thomas L. Peterson

[57] ABSTRACT

An optical fiber cable comprising a close-packed assembly of cylindrical strength members defining at least one cuspid interstice loosely receiving a single optical fiber therein.

1 Claim, 4 Drawing Figures

OPTICAL FIBER CABLE

BACKGROUND OF THE INVENTION

This invention relates to an optical fiber cable and is concerned with a cable construction affording good crush resistance for one or more single optical fibers in the cable.

SUMMARY OF THE INVENTION

According to the present invention there is provided an optical fiber cable including a close packed assembly of substantially circular cross-section strength members defining one or more interstices in at least one of which a single fiber is mounted.

DESCRIPTION OF THE PREFERRED EMBODIMENTS

Figure 1:
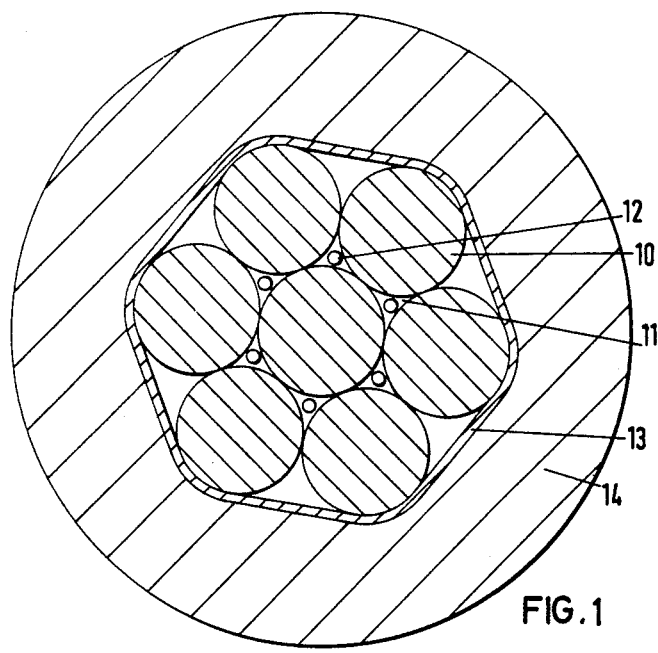
FIG. 1 is a cross-sectional view of an optical fiber cable incorporating six optical fibers.

The cable of FIG. 1 consists of a close-packed group of seven identical non-optical strength members 10 in the six interstices 11 of which are loosely mounted six optical fibers 12. The strength members and optical fibers are taped together with tape 13 and encased in an extruded plastic sheath 14.

The optical fibers are typically glass fibers each provided with a plastic protective coating, not shown. Typically the coating increases the fiber diameter from about 100 $\mu$m, to about 120 $\mu$m is made of a polyurethane or polyimide enamel. Simple trigonometry shows that if the strength members are of radius R and the optical fibers are of radius r, then $r \leq R$ (sec 30°-1). Therefore, for an optical fiber with an overall diameter of 120 $\mu$m, the strength members must be at least 766 $\mu$m in diameter. Obviously, it is not prudent to aim for an exact fit, and hence the strength members may be typically 0.8 mm in diameter, and the overall diameter of the cable, including its sheath 14, about 4.5 mm.

The strength members may be made of steel. Tests on a group of seven 0.4 mm stainless steel close-packed strands revealed that the extension under tensile load was approximately linear and reversible up to 0.7% strain produced by a tension of 1000 N. Extrapolating from this result for the proposed design using 0.8 mm strands gives 4000 N tension for the same extension. The crush resistance is high because the steel wires are in contact along their length.

Since the optical fibers do not fill the interstices and, moreover, will in general be able to move a small amount, it may be desired to fill the interstices with a lubricant, such as petroleum jelly while the strength members and optical fibers are being stranded together. Alternatively, the residual space can be partially or completely filled by providing one or more of the strength members with thin thermoplastic coatings prior to the stranding operation. Then, either during the extrusion of the protective sheath 14, or at some other time, the assembly is heated to cause the thermoplastic material to be squeezed out from between the points of contact of individual pairs of strength members into the interstices.

With steel strength members capable of sustaining a 0.7% extension, it is the steel that normally is the limiting factor in the extension of the whole cable since a typical bare silica optical fiber is able to sustain an extension of about 1%, and an on-line coated silica optical fiber, about 1½%. Thus, the useable strain with negligible permanent offset up to 0.7% will normally give an adequate safety margin for use with on-line coated fibers.

For some applications, if may be desirable or necessary to avoid the use of metal in the cable. This can be achieved by replacing the steel strength members with high tensile strength plastic strength members. Plastic materials that can be used for this purpose include aromatic polyamide material such as that sold under the trademark Kevlar. In this instance, a strength member may be a single strand in which filaments of the aromatic polyamide material are embedded in a bonding resin, or it may be a plait of several strands of the aromatic polyamide material encased in a hard plastic coating. The aromatic polyamide is not as strong as the steel referred to previously, but has the advantage of having a lower specific gravity. For instance with seven 8-strand plaits of 0.7 mm overall diameter, the load is about 2000 N at 1.1% extension, but the weight reduction compared with the equivalent structure in steel is about 30%. However, since these strength members are not isotropic, the crush resistance of the cable is reduced.

Figure 2:
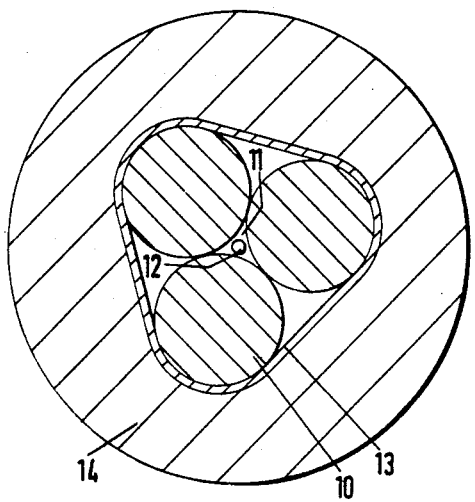
FIGS. 2, 3, and 4 are cross-sectional views of different optical fiber cables incorporating respectively one, four, and twenty-four optical fibers.
Figure 3:
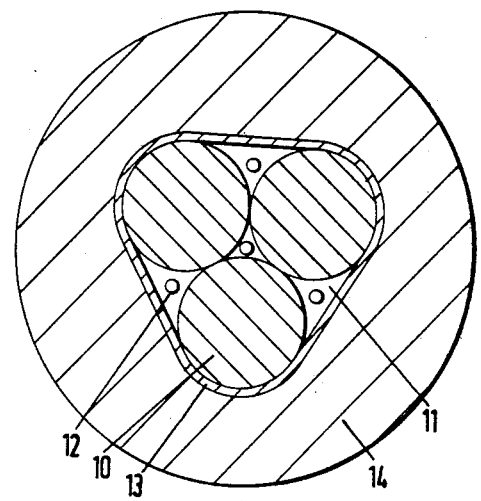
Figure 4:
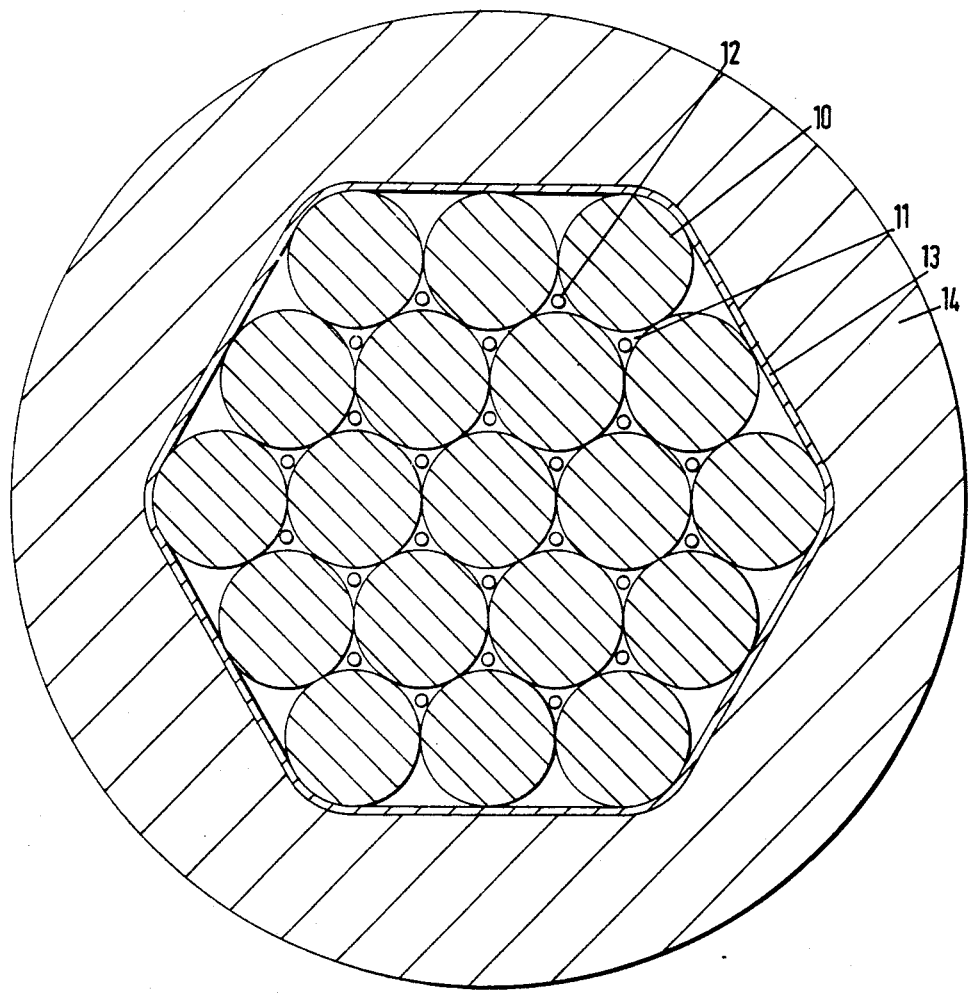

It is to be understood that the invention is not limited to a cable using seven strength members. FIG. 2 depicts a single optical fiber cable which uses only three strength members. FIG. 3 shows how the cable of FIG. 2 may be modified to accommodate three additional optical fibers. It will be appreciated that this cable does not afford the same measure of crush protection for the three additional fibers as it does for the central fiber. Cables accommodating more than six fully protected fibers are also possible. FIG. 4 depicts the next larger regular hexagonal structure cable. This has the advantage of a higher proportion of fibers to strength members, but on account of the greater diameter, it is less flexible. In the cables of FIGS. 1 and 4, it will be apparent that it is not necessary for all of the interstices to house optical fibers.

What is claimed is:

1. A crush resistant optical fiber cable comprising at least three substantially circular cross-section non-optical strength members defining one or more tricuspid interstices therebetween, means surrounding said strength means over substantially their entire length retaining said strength members in a close-packed assembly in which each said strength member contacts the strength members immediately adjacent thereto, and a single optical fiber being loosely mounted in at least one of said interstices.

* * * * *